US012592224B2

(12) United States Patent
Kagoshima

(10) Patent No.: US 12,592,224 B2
(45) Date of Patent: Mar. 31, 2026

(54) PROGRAM, INFORMATION PROCESSING APPARATUS AND INFORMATION PROCESSING METHOD TO CHANGE LOCATION INFORMATION OF SLIDESHOW

(71) Applicant: KABUSHIKI KAISHA TOSHIBA, Tokyo (JP)

(72) Inventor: Takehiko Kagoshima, Yokohama (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 244 days.

(21) Appl. No.: 18/442,441

(22) Filed: Feb. 15, 2024

(65) Prior Publication Data

US 2024/0347048 A1 Oct. 17, 2024

(30) Foreign Application Priority Data

Apr. 13, 2023 (JP) ................................. 2023-065376

(51) Int. Cl.
*G10L 15/16* (2006.01)
*G10L 15/08* (2006.01)
*G10L 15/28* (2013.01)

(52) U.S. Cl.
CPC .............. *G10L 15/16* (2013.01); *G10L 15/28* (2013.01); *G10L 2015/088* (2013.01)

(58) Field of Classification Search
None
See application file for complete search history.

(56) References Cited

U.S. PATENT DOCUMENTS 11,200,889 B2 * 12/2021 Coucke et al. ......... G10L 15/16
2017/0206895 A1 7/2017 Tang
2023/0004810 A1 1/2023 Shibata

FOREIGN PATENT DOCUMENTS

JP 6453917 B2 1/2019
WO 2021111633 A1 6/2021
WO 2024053120 A1 3/2024

OTHER PUBLICATIONS

Fang et al. "NestDNN: Resource-Aware Multi-Tenant On-Device Deep Learning for Continuous Mobile Vision", Oct. 2018.*

(Continued)

*Primary Examiner* — Daniel C Washburn
*Assistant Examiner* — Nicholas D Lowen
(74) *Attorney, Agent, or Firm* — Holtz, Holtz & Volek PC

(57) ABSTRACT

According to an embodiment, an information processing apparatus includes one or more hardware processors configured to function as a memory control unit, a transformation unit, a first convolutional neural network (CNN), and a second CNN unit. The memory control unit reads a first stride parameter used for controlling an output resolution and a first dilation parameter used for controlling an input resolution from a memory device. The transformation unit transforms the first stride parameter to a second stride parameter and transforms the first dilation parameter to a second dilation parameter by using a transformation parameter. The first CNN unit executes first CNN processing of a feature vector by using at least the second stride parameter. The second CNN unit executes second CNN processing with an output vector of the first CNN unit as an input by using at least the second dilation parameter.

9 Claims, 12 Drawing Sheets

(56) References Cited

OTHER PUBLICATIONS

Sercu et al. "Dense Prediction on Sequences with Time-Dilated Convolutions for Speech Recognition", Dec. 2016.*
Yao et al. "ADCNN: Towards learning adaptive dilation for convolutional neural networks", Oct. 2021.*
Japanese Office Action (and an English language transation thereof) dated Feb. 17, 2026, issued in counterpart Japanese Application No. 2023-065376.

* cited by examiner

| ID | NOTATION | PRONUN-CIATION | COMMAND |
|---|---|---|---|
| 1 | CURRENT TIME | GENZAI JIKOKU | ACTIVATE CLOCK APPLICATION AND DISPLAY CURRENT TIME |
| 2 | TODAY'S WEATHER | KYO NO TENKI | ACTIVATE BROWSER AND DISPLAY WEATHER INFORMATION SITE |
| 3 | TODAY'S SCHEDULE | KYO NO YOTEI | ACTIVATE CALENDAR APP AND DISPLAY TODAY'S SCHEDULE |

TIME FRAME

FEATURE VECTOR

OUTPUT OF FIRST CNN UNIT

OUTPUT OF SECOND CNN UNIT

FIRST CNN UNIT 205
$(k_1=3, s'_1=1, d_1=1)$

SECOND CNN UNIT 206
$(k_2=3, s_2=1, d'_2=2)$

| | KERNEL SIZE | STRIDE | DILATION | WEIGHT PARAMETER |
|---|---|---|---|---|
| FIRST CNN UNIT | (5, 5) | [(1, 2), (1, 1), (1, 1), (1, 1)] | (1, 1) | $W_1$ |
| SECOND CNN UNIT | (5, 3) | [(6, 1), (6, 1), (3, 1), (2, 1), (1, 1)] | [(1, 1), (1, 2), (1, 2), (1, 2)] | $W_2$ |
| THIRD CNN UNIT | (3, 3) | (1, 1) | [(1, 1), (1, 2), (2, 2), (3, 2), (6, 2)] | $W_3$ |

FIG.10

| COMPUTATIONAL RESOURCE [MIPS] | SMALLER THAN 50 | 50 OR GREATER AND SMALLER THAN 100 | 100 OR GREATER AND SMALLER THAN 200 | 200 OR GREATER AND SMALLER THAN 300 | 300 OR GREATER |
|---|---|---|---|---|---|
| TRANS-FORMATION PARAMETER | 1 | 2 | 3 | 4 | 5 |

PROGRAM, INFORMATION PROCESSING APPARATUS AND INFORMATION PROCESSING METHOD TO CHANGE LOCATION INFORMATION OF SLIDESHOW

CROSS-REFERENCE TO RELATED APPLICATIONS

This application is based upon and claims the benefit of priority from Japanese Patent Application No. 2023-065376, filed on Apr. 13, 2023; the entire contents of which are incorporated herein by reference.

FIELD

Embodiments described herein relate generally to an information processing apparatus, an information processing method, and a computer program product.

BACKGROUND

Frame skipping is conventionally known as a method of reducing computational amounts of neural networks. This method is a technique of executing neural network processing only on odd-numbered frames and outputting the result to use the odd-numbered output without executing the processing on even-numbered frames, thereby halving the computational amounts, for example.

However, by the conventional technique, in a case in which convolutional neural network models are used, the flexible implementation to control the trade-off between computational amounts and accuracy with a single model could not been achieved.

BRIEF DESCRIPTION OF THE DRAWINGS

FIG. 9 is a diagram illustrating examples of parameters according to the second embodiment;

FIG. 10 is a diagram illustrating examples of transformation parameters corresponding to computational resources according to the second embodiment;

DETAILED DESCRIPTION

According to an embodiment, an information processing apparatus includes one or more hardware processors configured to function as a memory control unit, a transformation unit, a first convolutional neural network (CNN), and a second CNN unit. The memory control unit reads a first stride parameter used for controlling an output resolution and a first dilation parameter used for controlling an input resolution from a memory device. The transformation unit transforms the first stride parameter to a second stride parameter and transforms the first dilation parameter to a second dilation parameter by using a transformation parameter. The first CNN unit executes first CNN processing of a feature vector by using at least the second stride parameter. The second CNN unit executes second CNN processing with an output vector of the first CNN unit as an input by using at least the second dilation parameter. According to embodiments, an information processing apparatus, an information processing method, and a computer program product will be described in detail below with reference to the accompanying drawings.

First Embodiment

First, an example of a hardware configuration of an information processing apparatus 100 according to a first embodiment will be described.

Figure 1:
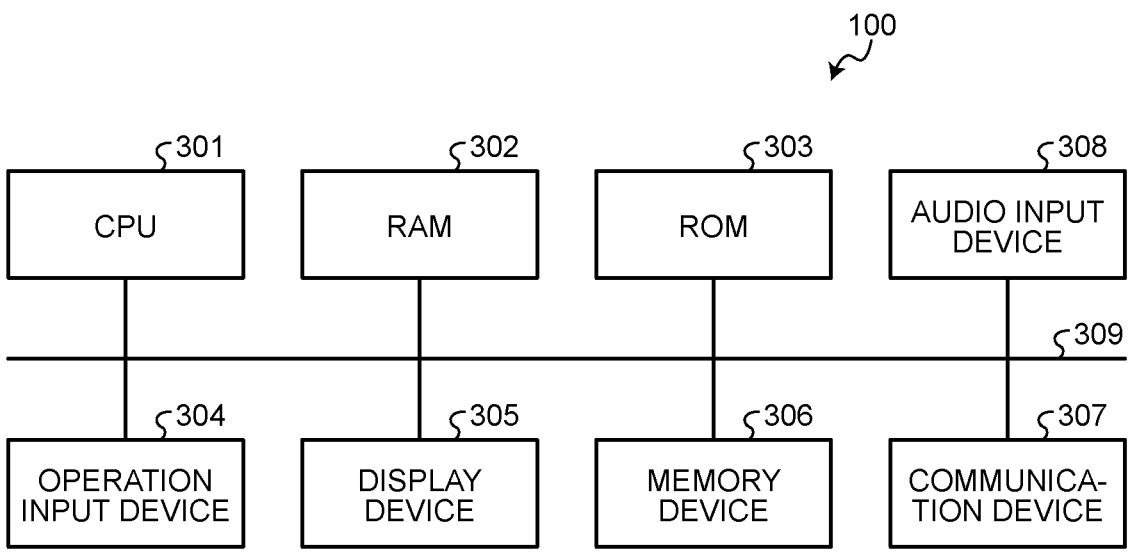
FIG. 1 is a diagram illustrating an example of a hardware configuration of an information processing apparatus according to a first embodiment.

Example of Hardware Configuration FIG. 1 is a diagram illustrating the example of the hardware configuration of the information processing apparatus 100 according to the first embodiment. The example in FIG. 1 illustrates a case in which the information processing apparatus 100 of the first embodiment is implemented as a keyword utterance detection device and a command activation system installed in a smart device such as a smartphone.

The information processing apparatus 100 of the first embodiment is provided with a central processing unit (CPU) 301, a random access memory (RAM) 302, a read only memory (ROM) 303, an operation input device 304, a display device 305, a memory device 306, a communication device 307, and an audio input device 308. The CPU 301, the RAM 302, the ROM 303, the operation input device 304, the display device 305, the memory device 306, the communication device 307, and the audio input device 308 are connected to one another via a bus 309.

The CPU 301 is a processor that executes arithmetic processing, control processing, and other processing according to a computer program. The CPU 301 uses a predetermined area of the RAM 302 as a work area and executes various processes in cooperation with computer programs stored in the ROM 303, the memory device 306, and other units.

The RAM 302 is a memory such as synchronous dynamic random access memory (SDRAM). The RAM 302 serves as a work area for the CPU 301. The ROM 303 is a nonrewritable memory that stores therein computer programs and various pieces of information.

The operation input device 304 is an input device such as a touch screen and a keyboard. The operation input device 304 accepts information operated and input by a user as an instruction signal and outputs the instruction signal to the CPU 301.

The display device 305 is a display device such as a liquid crystal display (LCD). The display device 305 displays various pieces of information based on display signals transmitted from the CPU 301.

The memory device 306 is a device that writes and reads out data on a semiconductor storage medium such as flash memory, a magnetic or optically recordable storage medium, or the like. The memory device 306 writes and reads out data to and from the storage medium in response to controls from the CPU 301.

The communication device 307 communicates with external devices via a network in response to controls from the CPU 301.

The audio input device 308 is composed of a microphone, an analog-to-digital conversion (AD conversion) device, and other units, converts audio signals uttered by a user into digital signals, and outputs the signals to the CPU 301.

Example of Functional Configuration

Figure 2:
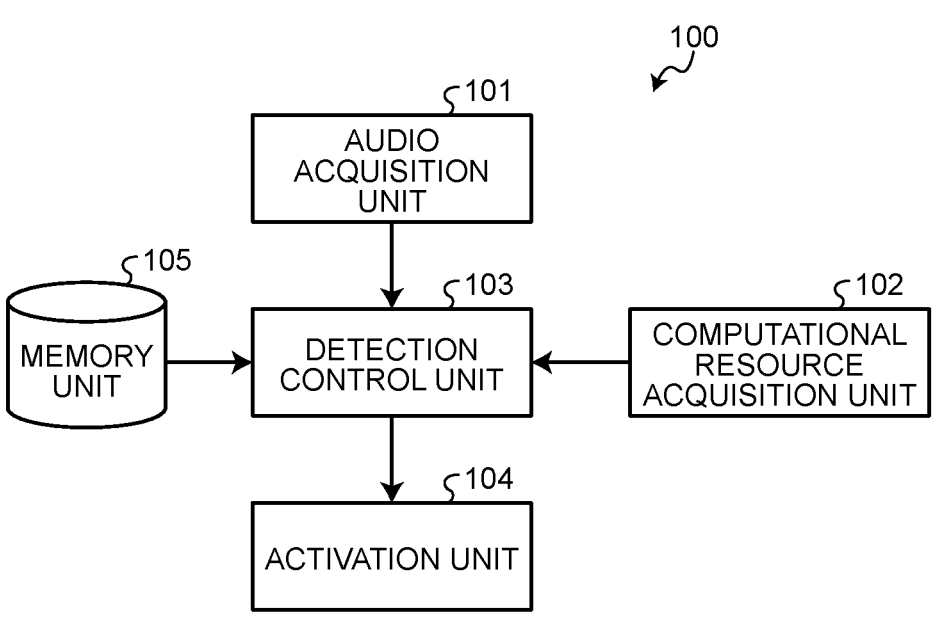
FIG. 2 is a diagram illustrating an example of a functional configuration of the information processing apparatus according to the first embodiment.

FIG. 2 is a diagram illustrating an example of a functional configuration of the information processing apparatus 100 according to the first embodiment. The information processing apparatus 100 of the first embodiment operates as a command activation system that recognizes predetermined keywords included in utterances of the user and executes appropriate commands installed in, for example, a smart device. The information processing apparatus 100 of the first embodiment is provided with an audio acquisition unit 101, a computational resource acquisition unit 102, a detection control unit 103, an activation unit 104, and a memory unit 105.

The audio acquisition unit 101 acquires audio input to a microphone, converts the audio into a digital signal, and inputs an audio signal represented by the digital signal to the detection control unit 103.

The computational resource acquisition unit 102 acquires computational resource information, including a computational capability of the CPU 301 and a load on the CPU 301, and inputs the computational resource information available to the detection control unit 103 at that time to the detection control unit 103. For example, provided that the CPU 301 has a computational capability of 1000 million instructions per second (MIPS), and the CPU 301 has a load of 80%, the computational resource information indicating 200 MIPS of the available computational resource is input to the detection control unit 103.

The detection control unit 103 executes a process of detecting a keyword utterance from the audio signals input from the audio acquisition unit 101, and a keyword ID corresponding to the keyword utterance is input to the activation unit 104 when the keyword utterance is detected. At this time, the detection control unit 103 executes a keyword detection process within the range of computational amount indicated by the computational resource information with reference to the computational resource information input from the computational resource acquisition unit 102.

The activation unit 104 activates a command associated with the keyword ID input from the detection control unit 103.

The memory unit 105 stores therein information. For example, the memory unit 105 stores therein the information that is referenced in the keyword detection process executed by the detection control unit 103.

Figures 3, 4:
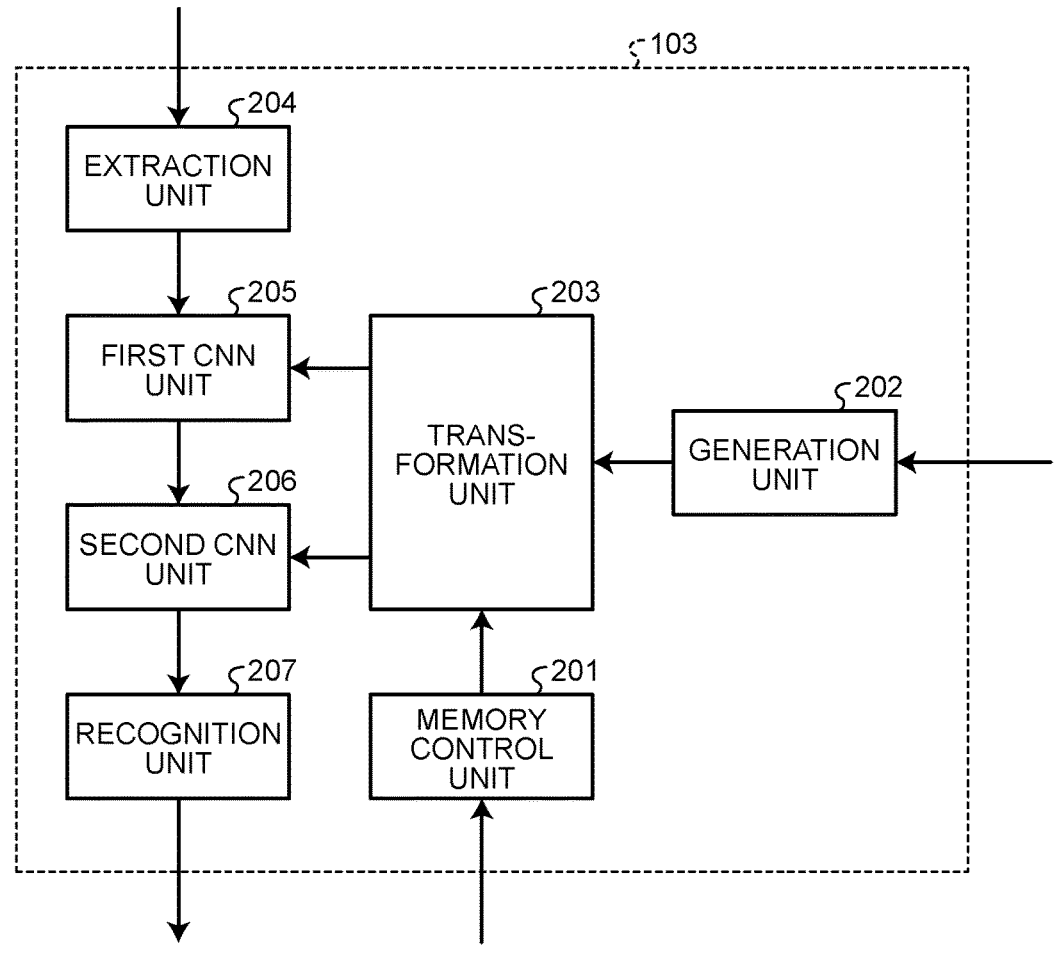
FIG. 3 is a diagram illustrating an example of correspondence information on keywords and commands according to the first embodiment.
FIG. 4 is a diagram illustrating an example of a functional configuration of a detection control unit according to the first embodiment.

FIG. 3 is a diagram illustrating an example of correspondence information on keywords and commands according to the first embodiment. In the information processing apparatus 100 of the first embodiment, three keyword IDs illustrated in FIG. 3 are registered in a command activation system of the first embodiment, and the command activation system is configured to execute a command corresponding to each of the keyword IDs.

The correspondence information on the keywords and commands of the first embodiment includes IDs, notations, pronunciations, and commands. Each ID is identification information for identifying a keyword. Each notation denotes a notation of the keyword. Each pronunciation denotes a pronunciation of the keyword. Each command denotes a command associated with the keyword.

For example, "CURRENT TIME" with ID=1 is associated with a command to activate a clock application and display the current time.

Next, the detailed operation of the detection control unit 103 of the first embodiment is described with reference to FIG. 4. FIG. 4 is a diagram illustrating an example of a functional configuration of the detection control unit 103 according to the first embodiment. The detection control unit 103 of the first embodiment is provided with a memory control unit 201, a generation unit 202, a transformation unit 203, an extraction unit 204, a first convolutional neural network (CNN) unit 205, a second CNN unit 206, and a recognition unit 207.

The memory control unit 201 performs storage control to read, write, and delete information stored in the memory unit 105. For example, the memory control unit 201 reads the kernel size $k_1=3$, the stride $s_1=1$, the dilation $d_1=1$, and the weight parameter $W_1$ from the memory unit 105 as parameters for the first CNN unit 205, and reads the kernel size $k_2=3$, the stride $s_2=1$, the dilation $d_2=2$, and the weight parameter $W_2$ from the memory unit 105 as parameters for the second CNN unit 206.

The generation unit 202 generates a transformation parameter r based on the computational resource information input from the computational resource acquisition unit 102. For example, the generation unit 202 generates the transformation parameter r=1 provided that the computational resource information is 100 MIPS or greater, and generates the transformation parameter r=2 provided that the computational resource information is smaller than 100 MIPS. The generation unit 202 inputs the generated transformation parameters r to the transformation unit 203.

The transformation unit 203 calculates the stride $s_1'$ input to the first CNN unit 205 and the dilation $d_2'$ input to the second CNN unit 206 with the following equations (1) and (2).

$$s_1' = rs_1 \tag{1}$$

$$d_2' = d_2/r \tag{2}$$

The transformation unit 203 generates the stride $s_1'$ by multiplying the stride $s_1$ by the transformation parameter r and generates the dilation $d_2'$ by multiplying the dilation $d_2$ by the reciprocal of the transformation parameter r. By the transformation of the parameters in this way, the trade-off between accuracy (time resolution of output) and computational amount can be controlled by a model with the same weight parameter.

It is required to employ an integer as the value of the dilation. Thus, it is required to employ an aliquot of the dilation $d_2$ as the transformation parameter r.

The transformation unit 203 inputs the kernel size $k_1$, the stride $s_1'$, the dilation $d_1$, and the weight parameter $W_1$ to the first CNN unit 205, and inputs the kernel size $k_2$, the stride $s_2$, the dilation $d_2'$, and the weight parameter $W_2$ to the first CNN unit 205.

The extraction unit 204 performs a short-time Fourier transform on the audio signal input from the audio acquisition unit 101 with a window length of 32 ms and a frame shift of 10 ms, and further transforms the data obtained after performing the short-time Fourier transform to a 32-dimensional Mel-filterbank feature vector.

In addition to the Mel-filterbank, for example, various other features such as Mel Frequency Cepstral Coefficient (MFCC) can be used as feature vectors that represent the features of the input audio. Furthermore, neural networks may also be used to extract features.

The first CNN unit 205 performs one-dimensional CNN processing in the time direction on the feature vectors input from the extraction unit 204 by using the parameters input from the transformation unit 203, followed by batch normalization processing and activation processing using the Rectified Linear Unit (ReLU) function in sequence.

The second CNN unit 206 performs one-dimensional CNN processing in the time direction on the output data of the first CNN unit 205 by using the parameters input from the transformation unit 203, followed by batch normalization processing and activation processing with the ReLU function in sequence.

The recognition unit 207 recognizes the audio by using the output vector of the second CNN unit 206. Specifically, the recognition unit 207 performs one-layer fully-connected neural network processing on the output of the second CNN unit 206, followed by Softmax activation processing to generate a four-dimensional output vector $y=[y_0, y_1, y_2, y_3]$ per frame.

Here, $y_0$ represents the probability that the utterance does not contain the keyword. $y_1$, $y_2$, and $y_3$ represent the probability that the keyword IDs contain keywords 1, 2, and 3, respectively. In a case in which any one of $y_1$, $y_2$, and $y_3$ among these four values of the probability is the largest, for example, the recognition unit 207 outputs the keyword ID corresponding to the largest probability value as the detection result.

The audio recognition performed by the recognition unit 207 may be used for the purpose of converting the input audio into text and other purposes in addition to the purpose of detecting keywords included in the input audio.

Next, the operation of the detection control unit 103 according to the first embodiment will be described in detail, focusing on the difference between a computational resource with high-availability (for example, 200 MIPS) and a computational resource with low-availability (for example, 80 MIPS).

In the case in which the computational resource is 200 MIPS, the output of the generation unit 202 is r=1. Therefore, it is defined based on the above-described equations (1) and (2) that $s_1'=s_1=1$ and $d_2'=d_2=2$. The relationship between the input vector, each frame of the output of the first CNN unit 205 and each frame of the output of the second CNN unit 206, and the operation in CNN in this case is illustrated in FIG. 5.

Figure 5:
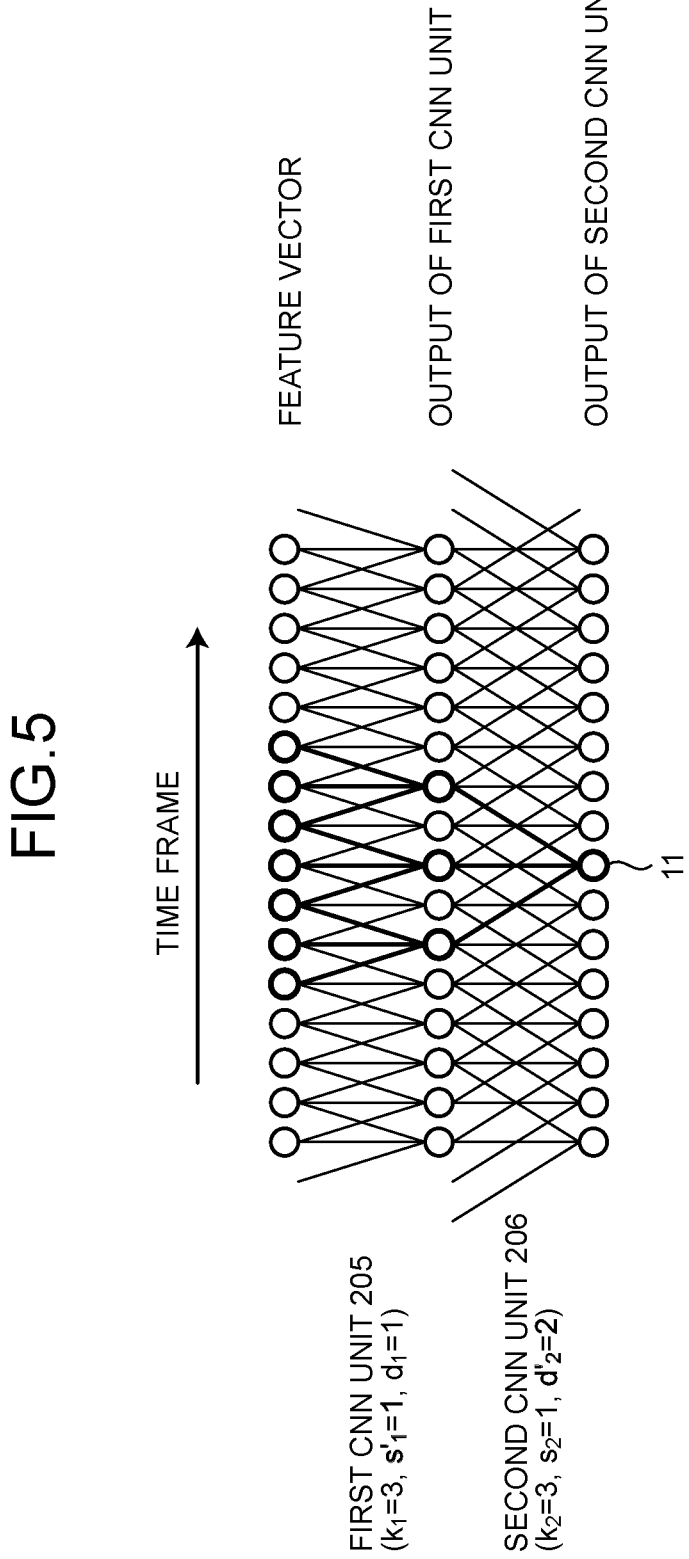
FIG. 5 is a diagram illustrating a first example of convolutional neural network processing according to the first embodiment.

FIG. 5 is a diagram illustrating a first example of the convolutional neural network processing according to the first embodiment. The circles in FIG. 5 represent frames of input and output. The lines connecting the circles represent input frames each of which is referenced when the output frame is generated by the convolution operation.

Focusing on one frame 11 of the output of the second CNN unit 206, three frames in the output of the first CNN unit 205 are referenced to generate the frame 11, and seven frames of the input feature vector are referenced in order to output these three frames. Furthermore, in the example in FIG. 5, the number of output frames of the second CNN unit 206 is the same as the number of frames of the input feature vector, which indicates that the time resolution is preserved.

On the other hand, in the case in which the computational resource is 80 MIPS, the output of the generation unit 202 is r=2. Therefore, it is defined based on the above-described equations (1) and (2) that $s_1'=2s_1=2$ and $d_2'=d_2/2=1$. The relationship between the input vector, each frame of the output of the first CNN unit 205 and each frame of the output of the second CNN unit 206, and the operation in CNN in this case is illustrated in FIG. 6.

Figure 6:
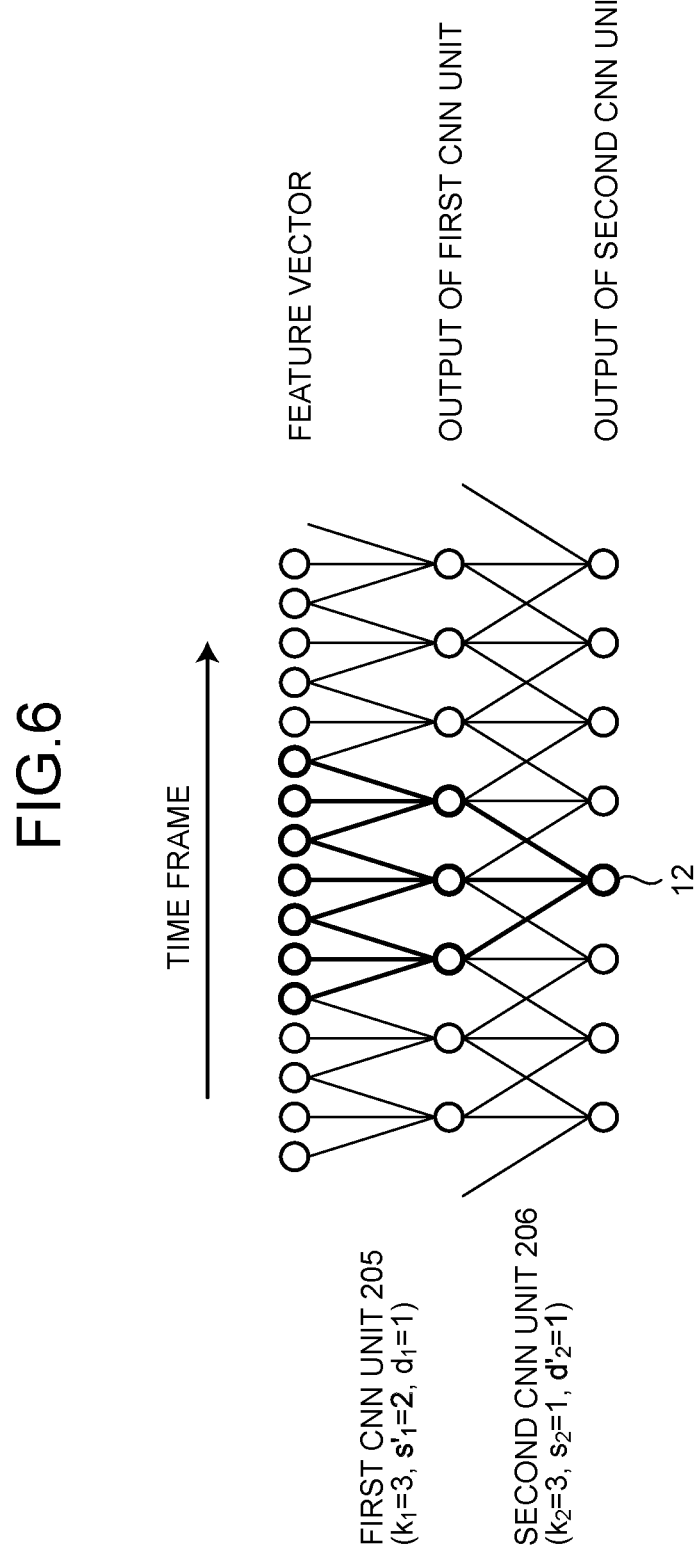
FIG. 6 is a diagram illustrating a second example of the convolutional neural network processing according to the first embodiment.

FIG. 6 is a diagram illustrating a second example of the convolutional neural network processing according to the first embodiment. Focusing on one frame 12 of the output of the second CNN unit 206, the value of the output is equal to the output of the corresponding frame 11 in FIG. 5 because the input-output dependencies are identical to that illustrated in FIG. 5. Meanwhile, the number of the output frames of the second CNN unit 206 is reduced in half of the number of the frames of the input feature vector. Accordingly, the time resolution is reduced to cause a slight performance reduction, but the computational amount required is reduced to half of that of the case illustrated in FIG. 5.

The detection control unit 103 of the first embodiment is set up so that real-time processing can be sufficiently achieved at 100 MIPS of computational amount in the configuration illustrated in FIG. 5. Therefore, in the case in which the available computational resource is 100 MIPS or greater, the output is generated at a high time resolution focusing on detection accuracy. In addition, even in the case in which the available computational resource is smaller than 100 MIPS, the real-time processing can be achieved by the reduction of the computational amount in half with the configuration in FIG. 6, which enables the execution of the keyword utterance detection with only a slight performance reduction.

Figure 7:
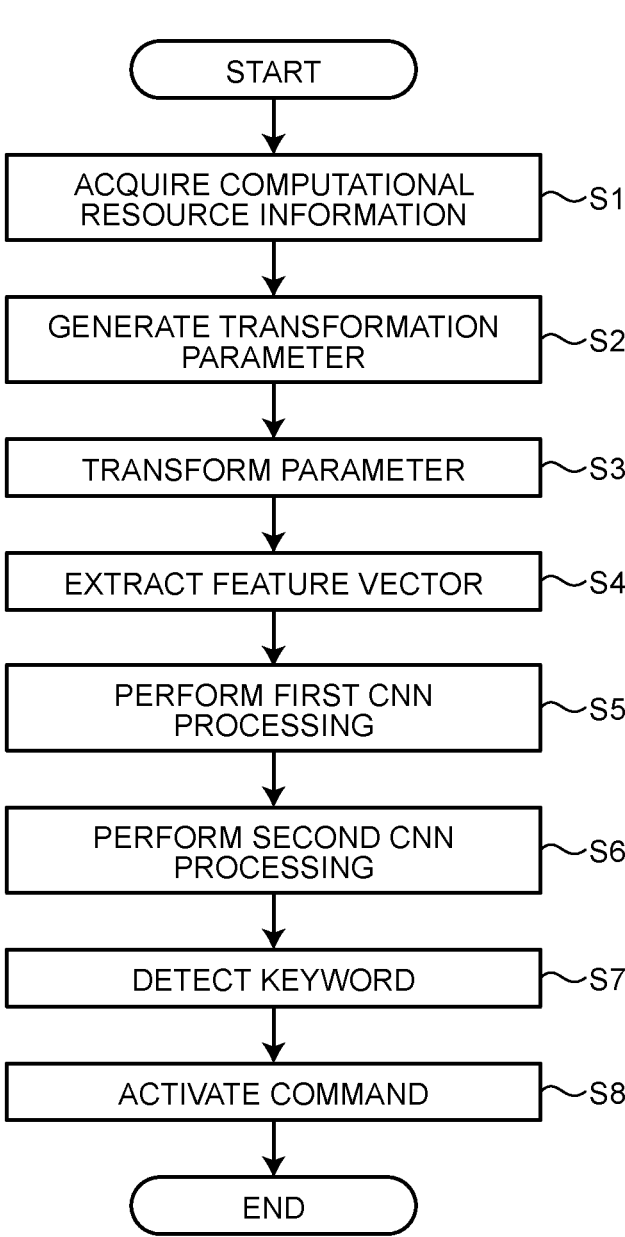
FIG. 7 is a flowchart illustrating an example of an information processing method according to the first embodiment.

Example of Information Processing Method FIG. 7 is a flowchart illustrating an example of an information processing method according to the first embodiment. First, the computational resource acquisition unit 102 acquires the above-described computational resource information (step S1). Next, the generation unit 202 generates the transformation parameter r based on the computational resource information obtained at the step S1 (step S2).

Next, the transformation unit 203 transforms the stride parameter $s_1'$ input to the first CNN unit 205 and the dilation parameter $d_2'$ input to the second CNN unit 206 by using the following equations (1) and (2) (step S3).

Next, the extraction unit 204 extracts a feature vector indicating the feature (feature amount) of the audio from the audio signal input from the audio acquisition unit 101 (step S4).

Next, the first CNN unit 205 performs one-dimensional CNN processing in the time direction on the feature vector extracted at the step S4 by using the stride parameter $s_1'$ transformed at the step S3 (step S5). Next, the second CNN unit 206 performs one-dimensional CNN processing in the time direction on the output data of the first CNN unit 205 by using the dilation parameter $d_2'$ transformed at the step S3 (step S6).

Next, the recognition unit 207 detects a keyword included in the audio by using the output vector of the second CNN unit 206 (step S7), and the activation unit 104 activates a command associated with the keyword (step S8).

As described above, in the information processing apparatus 100 of the first embodiment, the memory control unit 201 reads the stride $s_1$ (first stride parameter) for controlling the output resolution, and the dilation $d_2$ (first dilation parameter) for controlling the input resolution from the memory unit 105. The transformation unit 203 transforms the stride $s_1$ to the stride $s_1'$ (second stride parameter) and transforms the dilation $d_2$ to dilation $d_2'$ (second dilation parameter) by using the transformation parameter r. The first CNN unit 205 performs the first CNN processing of the feature vector by using at least the second stride parameter. The second CNN unit 206 then performs the second CNN processing with the output vector of the first CNN unit 205 as an input by using at least the second dilation parameter.

Accordingly, the information processing apparatus 100 of the first embodiment can achieve a flexible implementation to control the trade-off between computational amount and accuracy with a single model even though a convolutional neural network model is used. For example, in a convolutional neural network with two or more layers, it is possible to switch between an accuracy orientation (although the computational amount is high, the output resolution is high) and a computational amount orientation (although the computational amount is low, the outputs are thinned-out) by the control on the transformation parameter r. In other words, the effect is that the same neural network model can be run on various computers with different computational capabilities.

Specifically, the detection control unit 103 of the first embodiment is capable of highly accurate detection by using a convolutional neural network model, as well as flexible control of the trade-off between accuracy and computational amount. Accordingly, there is an effect that the real-time processing can be executed by changing the configuration in a case in which the computational resources are limited.

Such flexible processing can be achieved by preparing a plurality of models in advance and switching between the models, but in this case, there is a challenge to increase the memory capacity for storing the models. By contrast, in the first embodiment, a single model can cope with the flexible processing, thus resulting in the effect to achieve the implementation with saving memory.

The detection control unit 103 of the first embodiment can achieve the real-time processing by using processors with various capabilities according to the computational capabilities thereof. Therefore, there is no need to develop a neural network model for each processor, resulting in the effect of reducing development costs.

For example, the information processing apparatus 100 (first information processing apparatus) may perform a process of transforming a parameter to be matched with a processor of any device (second information processing apparatus) in response to an operation input from a developer, and the transformed parameter may be incorporated into the second information processing apparatus. In this case, the first information processing apparatus is not required to perform the CNN processing, and the second information processing apparatus may not include a function to perform the process of transforming a parameter.

That is, it can also be considered that the information processing method includes the following steps of: by the first information processing apparatus, reading the first stride parameter used for controlling the output resolution and the first dilation parameter used for controlling the input resolution from the memory device; by the first information processing apparatus, transforming, by using the transformation parameter, the first stride parameter to the second stride parameter and transforming the first dilation parameter to the second dilation parameter; by the first information processing apparatus, storing at least the second stride parameter in the second information processing apparatus as a parameter used in the first CNN processing of the feature vector; and by the first information processing apparatus, storing at least the second dilation parameter in the second information processing apparatus as a parameter used in the second CNN processing with the output vector of the first CNN processing as an input.

In the related art, in a case of a model in which the output is able to be computed from only an input of a single frame, the number of skip frames can be changed to tune the computational amount without changing the model. However, in the convolutional neural network, not only an input of a single frame is referenced, but also the inputs before and after the input of the single frame are referenced. Thus, the number of skip frames cannot be changed because changing the number of skip frames affects the outputs. Therefore, in the case of using the convolutional neural network model, the flexible implementation to control the trade-off between the computational amount and the accuracy with a single model could not been achieved. In order to achieve such flexibility, it was required to train and install a plurality of models with different computational complexities in advance and switch between these models, which caused challenges such as an increase in the memory capacity for storing the models and an increase in the cost of developing models.

Second Embodiment

Next, a second embodiment will be described. In the description of the second embodiment, similar explanations to that of the first embodiment will not be repeated, and the differences from the first embodiment will be described.

Example of Functional Configuration

Figure 8:
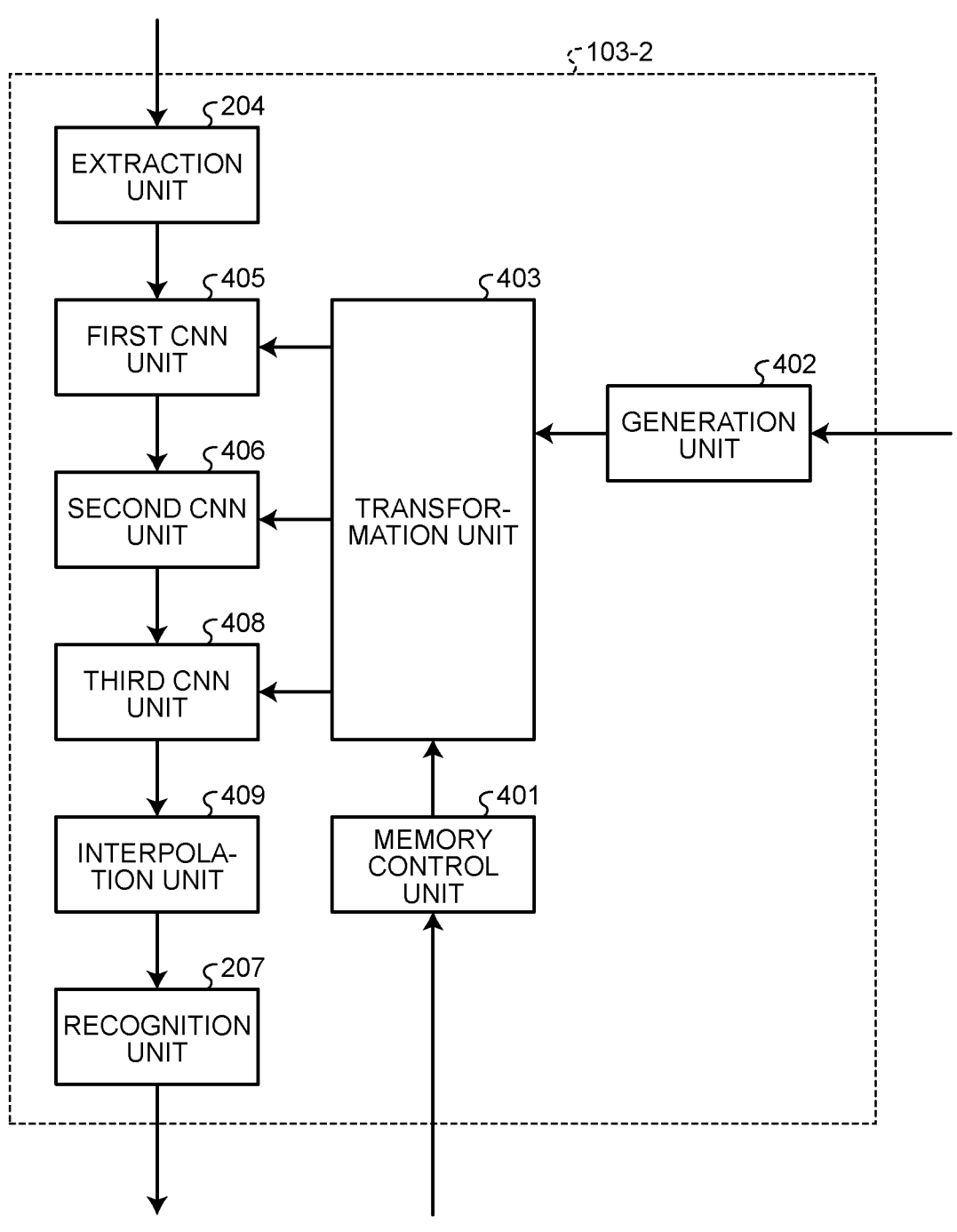
FIG. 8 is a diagram illustrating an example of a functional configuration of an information processing apparatus according to a second embodiment.

FIG. 8 is a diagram illustrating an example of a functional configuration of the information processing apparatus according to the second embodiment. The same numerical numbers are given to the same components as those in the first embodiment described above, and the explanations will not be repeated. The second embodiment differs mainly from the first embodiment described above in that the convolutional neural network is composed of three layers, each of which is a two-dimensional convolutional neural network, and that an interpolation unit 409 is added.

A detection control unit 103-2 of the second embodiment is provided with a memory control unit 401, a generation unit 402, a transformation unit 403, the extraction unit 204, a first CNN unit 405, a second CNN unit 406, a third CNN unit 408, the interpolation unit 409, and the recognition unit 207.

The memory control unit 401 stores the parameters illustrated in FIG. 9 in the memory unit 105 as a parameter corresponding to each of the first CNN unit 405, the second CNN unit 406, and the third CNN unit 408.

FIG. 9 is a diagram illustrating examples of parameters according to the second embodiment. The example in FIG.

9 illustrates a case in which the parameters of the second embodiment are stored in the table form. In the second embodiment, a two-dimensional convolutional neural network in the time direction (an example of a first direction) and the frequency direction (an example of a second direction) is used. Thus, individual parameters of the kernel size, stride, and dilation are represented by pairs of the parameters in the time direction and frequency direction.

For example, the kernel size $k_2$=(5,3) in the second CNN unit 406 represents a kernel size of 5 in the time direction and a kernel size of 3 in the frequency direction. Some of the stride and dilation parameters (for example, the stride in the first CNN unit 405) are represented by a list consisting of five parameters.

Each of the stride parameters included in the list includes a parameter used for controlling the output resolution in the frequency direction and a parameter used for controlling the output resolution in the time direction. In the same manner, each of the dilation parameters included in the list includes a parameter used for controlling the input resolution in the frequency direction and a parameter used for controlling the input resolution in the time direction.

The generation unit 402 generates a transformation parameter r based on the computational resource information input from the computational resource acquisition unit 102. Specifically, the generation unit 402 transforms a MIPS value contained in the computational resource information to the transformation parameter r according to the table illustrated in FIG. 10.

FIG. 10 is a diagram illustrating examples of transformation parameters corresponding to the computational resources according to the second embodiment. The example in FIG. 10 illustrates a case in which transformation parameters of the second embodiment are stored in the table form. For example, the MIPS values within a range of 100 or greater and smaller than 200 are transformed to transformation parameter r=3.

By using the transformation parameter r illustrated in FIG. 10 as an index, the transformation unit 403 selects the stride $s_1$' of the first CNN unit 405, the stride $s_2$' and the dilation $d_2$' of the second CNN unit 406, and the dilation $d_3$' of the third CNN unit 408 from the list of the parameters illustrated in FIG. 9.

For example, provided that the transformation parameter r is 1, the first element in the list of the parameters is selected. In this case, the stride $s_1$' of the first CNN unit 405, the stride $s_2$' and the dilation $d_2$' of the second CNN unit 406, and the dilation $d_3$' of the third CNN unit 408 are $s_1$'=(1,2), $s_2$'=(6,1), $d_2$'=(1,1), and $d_3$'=(1,1), respectively.

In addition, for example, provided that the transformation parameter r is 3, the third element in the list of the parameters is selected. In this case, the stride $s_1$' of the first CNN unit 405, the stride $s_2$' and the dilation $d_2$' of the second CNN unit 406, and the dilation $d_3$' of the third CNN unit 408 are $s_1$'=(1,1), $s_2$'=(3,1), $d_2$'=(1,2), and $d_3$'=(2,2), respectively.

In the second embodiment, with regard to a combination of the stride of the first CNN unit 405 and the dilation of the second CNN unit 406 and a combination of the stride of the second CNN unit 406 and the dilation of the third CNN unit 408, the available combinations are stored in the memory unit 105 as a list in advance. Therefore, the parameter is transformed according to the selection of an element in the list in which the transformation parameter r is used as an index, and there is no restriction on "r" to be the aliquot as in the first embodiment.

The first CNN unit 405 performs the two-dimensional CNN processing in the time direction and in the frequency direction on the feature vector input from the extraction unit 204 by using the parameters input from the transformation unit 403, followed by batch normalization processing and activation processing with the ReLU function in sequence.

The second CNN unit 406 performs the two-dimensional CNN processing in the time direction and in the frequency direction on the output vector of the first CNN unit 405 by using the parameters input from the transformation unit 403, followed by batch normalization processing and activation processing with the ReLU function in sequence.

The third CNN unit 408 performs two-dimensional CNN processing in the time direction and in the frequency direction on the output vector of the second CNN unit 406 by using the parameters input from the transformation unit 403, followed by batch normalization processing and activation processing with the ReLU function in sequence.

The interpolation unit 409 outputs the output vector of the third CNN unit 408 with interpolation in the time direction and frequency direction, as needed. In other words, in a case in which at least one of the time resolution and the frequency resolution of the output vector of the third CNN unit 408 is insufficient, the interpolation unit 409 interpolates at least one of the time resolution and the frequency resolution of the output vector.

The output vector to be processed by the interpolation unit 409 is not limited to that in two-dimension, but may be optional. For example, as in the first embodiment, the process performed by the interpolation unit 409 may also be applied to a case in which the output vector of the third CNN unit 408 is in one-dimension. For example, the process performed by the interpolation unit 409 may be applied to the output vector in three-dimension or higher dimensions.

Figure 11:
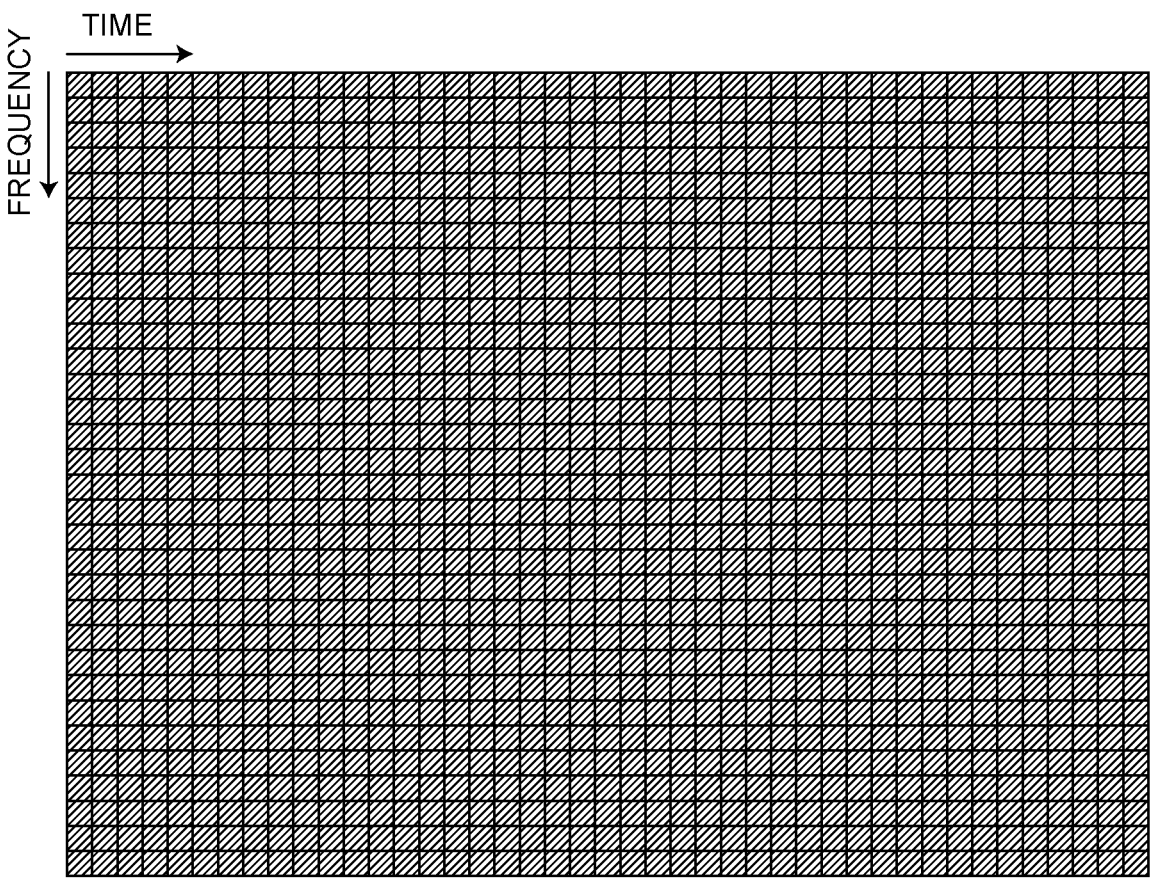
FIG. 11 is a diagram illustrating a first input example of an interpolation unit according to the second embodiment.
Figure 12:
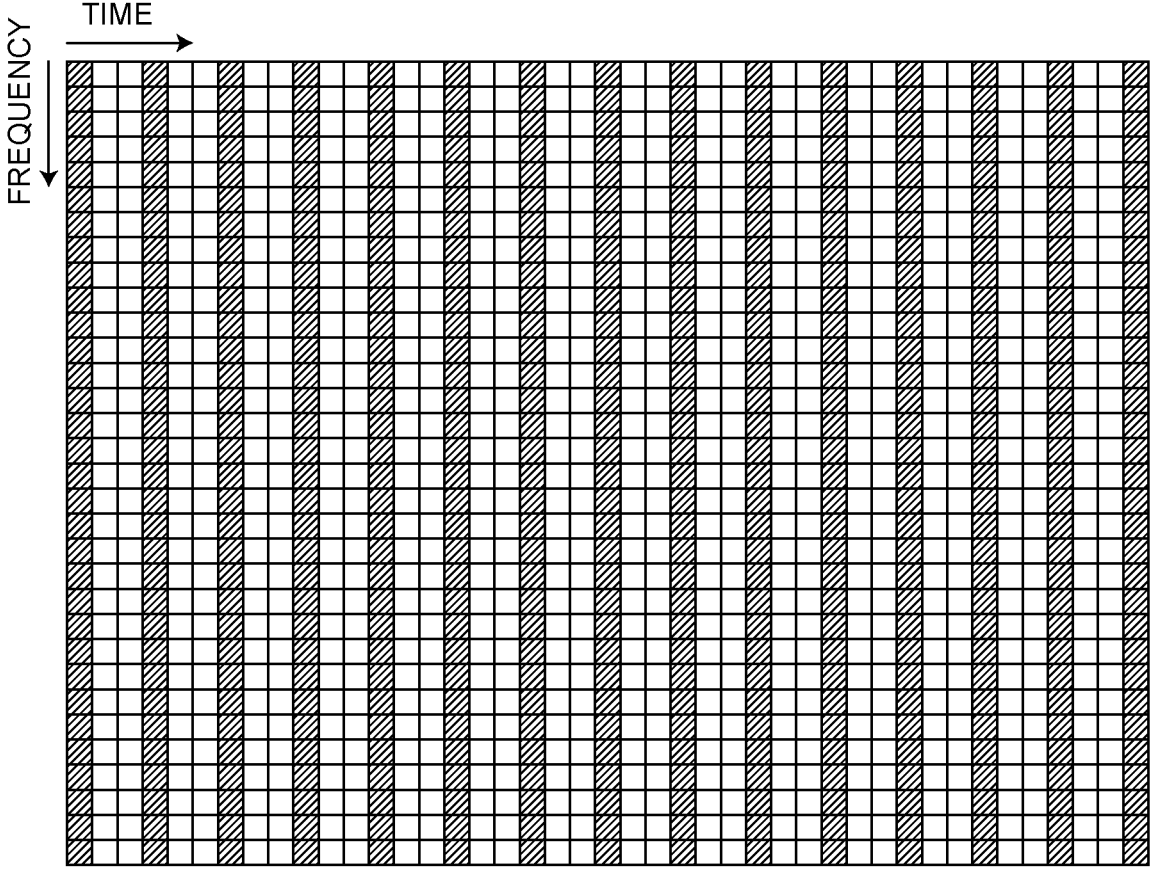
FIG. 12 is a diagram illustrating a second input example of the interpolation unit according to the second embodiment.
Figure 13:
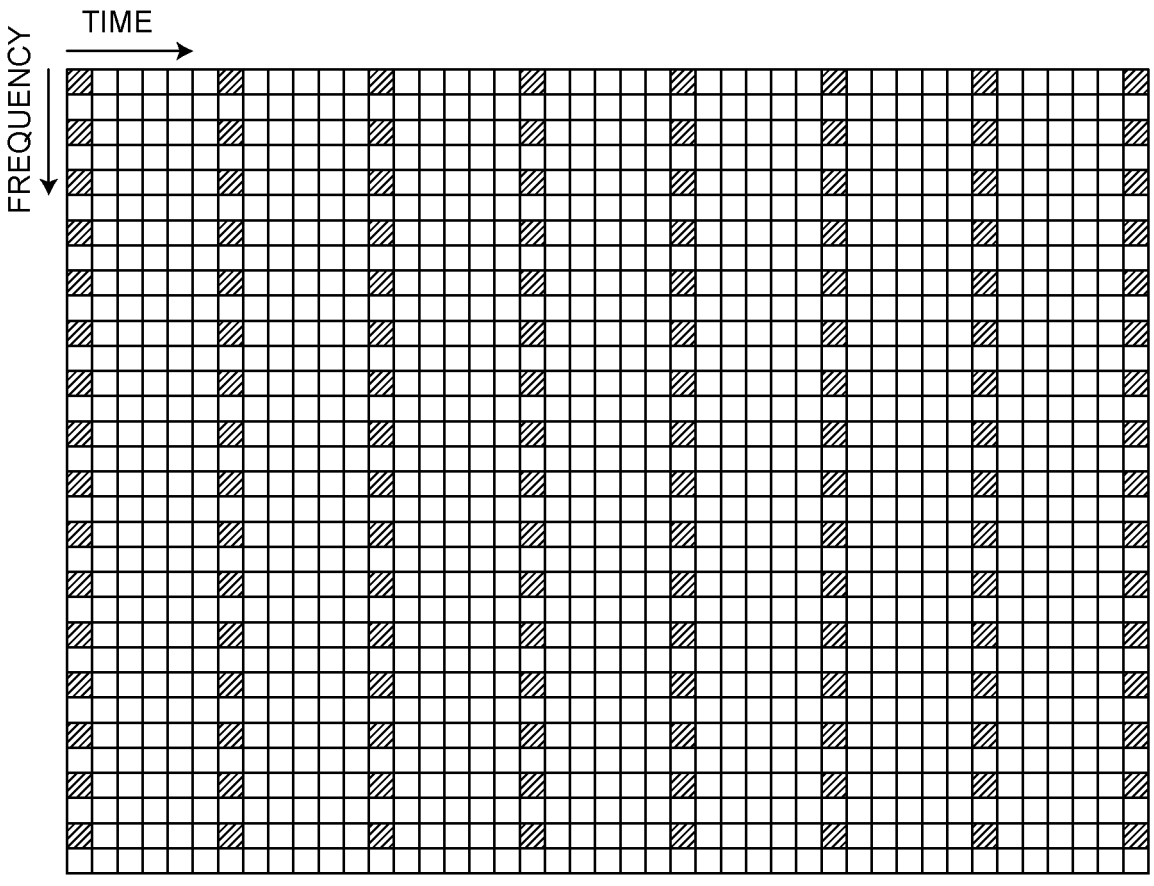
FIG. 13 is a diagram illustrating a third input example of the interpolation unit according to the second embodiment.

FIGS. 11, 12, and 13 are diagrams illustrating first to third input examples of the interpolation unit 409 according to the second embodiment. The first to third input examples in FIGS. 11, 12, and 13 represent a case in which the outputs of the third CNN unit 408 corresponding to feature vectors of 43 frames are input to the interpolation unit 409.

For example, provided that the transformation parameter r is 5, the strides in the time direction and frequency direction are all represented by 1. Therefore, vectors with 32-dimension in the frequency direction and 43 frames in the time direction similar to the input feature vectors are output, as illustrated in FIG. 11. In this case, the interpolation unit 409 does not perform the interpolation process and outputs the output vector of the third CNN unit 408 as it is.

In addition, for example, provided that the transformation parameter r is 3, the stride of the second CNN unit 406 in the time direction is 3. Therefore, the number of frames in the output is thinned-out to ⅓, and the output of the third CNN unit 408 is represented as in FIG. 12. Here, the shaded squares represent the presence of output data, and the white squares represent the absence of output data because of the skip caused by the stride. In this case, the interpolation unit 409 performs linear interpolation in the time direction and inserts the data corresponding to the white squares to set the output vectors to the same data size as those in FIG. 11, for example.

In addition, for example, provided that the transformation parameter r is 1, the stride of the first CNN unit 405 in the frequency direction is 2, and the stride of the second CNN unit 406 in the time direction is 6. Therefore, the number of frames in the output is thinned-out to ½ in the frequency direction and ⅓ in the time direction, and the output of the third CNN unit 408 is represented as in FIG. 13. In this case, the interpolation unit 409 performs linear interpolation in the time direction and frequency direction, and inserts the data corresponding to the white squares to set the output vectors to the same data size as those in FIG. 11, for example.

As illustrated in the examples in FIGS. 12 and 13, in a case in which the time resolution or frequency resolution of the neural network output is reduced (thinned-out) in the computational amount-oriented setting, the interpolation unit 409 generates the thinned-out output by the interpolation. Accordingly, there is an effect that the specifications of the output data are the same regardless of whether the setting is accuracy-oriented (setting to improve accuracy) or computational amount-oriented (setting to reduce computational amount), and subsequent processes can be standardized.

Example of Information Processing Method

Figure 14:
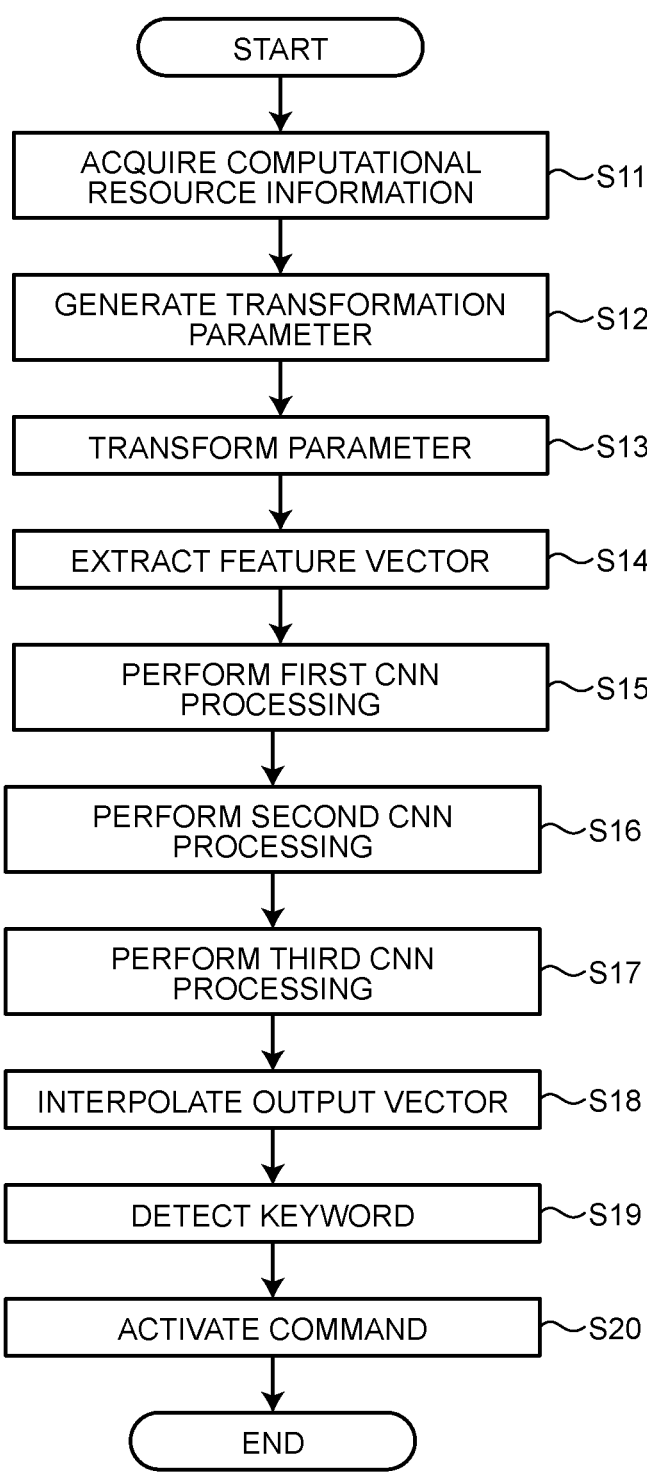
FIG. 14 is a flowchart illustrating an example of an information processing method according to the second embodiment.

FIG. 14 is a flowchart illustrating an example of an information processing method according to the second embodiment. First, the computational resource acquisition unit 102 acquires the above-described computational resource information (step S11). Next, the generation unit 402 generates the transformation parameter r according to the table illustrated in FIG. 10 by using the MIPS values included in the computational resource information acquired at the step S11 (step S12).

Next, the transformation unit 403 transforms the parameters of the first CNN unit 405, the second CNN unit 406, and the third CNN unit 408 (step S13). Specifically, by using the transformation parameter r illustrated in FIG. 10 as an index, the transformation unit 403 selects the stride $s_1'$ of the first CNN unit 405, the stride $s_2'$ and dilation $d_2'$ of the second CNN unit 406, and the dilation $d_3'$ of the third CNN unit 408 from the list of the parameters illustrated in FIG. 9.

Next, the extraction unit 204 extracts a feature vector indicating the feature of the audio from the audio signal input from the audio acquisition unit 101 (step S14).

Next, the first CNN unit 405 performs the two-dimensional CNN processing in the time direction and in the frequency direction on the feature vector extracted at the step S14 by using the stride parameter $s_1'$ transformed at the step S13 (step S15).

Next, the second CNN unit 406 performs the two-dimensional CNN processing in the time direction and in the frequency direction on the output data of the first CNN unit 405 by using the stride parameter $s_2'$ and the dilation parameter $d_2'$ transformed at the step S13 (step S16).

Next, the third CNN unit 408 performs the two-dimensional CNN processing in the time direction and in the frequency direction on the output data of the second CNN unit 406 by using the dilation parameter $d_3'$ transformed at the step S13 (step S17).

Next, the interpolation unit 409 outputs the output vector of the third CNN unit 408 with interpolation in the time direction and frequency direction, as needed (step S18).

Next, the recognition unit 207 detects a keyword included in the audio by using the output vector of the third CNN unit 408 (step S19), and the activation unit 104 activates a command associated with the keyword (step S20).

As described above, in the second embodiment, the memory unit 105 stores therein a plurality of strides s' (second stride parameters) and a plurality of dilations d' (second dilation parameters). The transformation unit 403 transforms the stride s (first stride parameter) by selecting one second stride parameter from the second stride parameters based on the transformation parameter r, and transforms the dilation $d_2$ (first dilation parameter) by selecting one second dilation parameter from a plurality of the second dilation parameters based on the transformation parameter r.

Accordingly, in the second embodiment, the same effect as the first embodiment is obtained.

In addition, in the second embodiment described above, since the two-dimensional convolutional neural network with three layers is used, more detailed modeling than in the first embodiment can be achieved, which provides the effect of improving detection accuracy. The transformation of the stride parameters and the transformation of the dilation parameters are carried out in the frequency direction as well as in the time direction, thereby expanding the tuning range of the computational amount and furthermore enabling fine-tuning in multiple stages. Accordingly, there is an effect of enabling the real-time processing with as little reduction of accuracy as possible in accordance with the available computational resource.

The first CNN unit 205 and the second CNN unit 206 of the first embodiment and the first CNN unit 405, the second CNN unit 406, and the third CNN unit 408 of the second embodiment described above are examples of performing the batch normalization processing and ReLU activation processing following the CNN processing, but not limited thereto, and various normalization and activation processes can be used. Pooling and other processes may also be applied, or skip connection and other configurations may be added. In addition, the parameter for the number of output channels is not described in these CNN processes, but any value can be set.

Furthermore, in the first and second embodiments, keyword utterance detection was described as an example, but the embodiments are not limited thereto, and the embodiments are applicable to any application as long as it uses a convolutional neural network with two or more layers. For example, the first and second embodiments described above are applicable to an audio recognition apparatus that can recognize not only keyword utterances but also continuous utterances, as a matter of course. For example, the first and second embodiments described above can also be applied to various types of signal processing with a sensor for the temperature, acceleration, light, or the like other than the audio, and to image or video processing. The same goes for processing other than audio, there is an effect of enabling the real-time processing with as little reduction of performance as possible in accordance with the available computational resources.

In addition, the convolutional neural networks of the first and second embodiments described above are described in the examples of the one- and two-dimensional convolutional neural networks, but can also be applied to the three-dimensional convolutional neural network or higher-dimensional convolutional neural networks.

Furthermore, the first and second embodiments described above are described in the examples of the implementation in smartphones, but may also be applied to personal computers (PCs), tablets, and various other embedded devices. The configurations of the first and second embodiments described above may be implemented with software (computer programs), or partially or fully implemented by hardware circuits.

Computer programs to be executed by a computer are provided as a file in the format that can be installed in or executed by the computer, with the programs recorded in a computer-readable recording medium, such as a CD-ROM, a flexible disk, a CD-R, or a digital versatile disc (DVD).

The computer program may also be stored in the computer connected to a network, such as the Internet, and may be configured to be provided by downloading via the network. This computer program may also be configured to be provided or distributed via the network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
one or more hardware processors configured to function as:
a memory control unit that reads a first stride parameter used for controlling an output resolution and a first dilation parameter used for controlling an input resolution from a memory device;
a transformation unit that transforms the first stride parameter to a second stride parameter and transforms the first dilation parameter to a second dilation parameter by using a transformation parameter;
a first convolutional neural network (CNN) unit that executes first CNN processing of a feature vector by using at least the second stride parameter; and
a second CNN unit that executes second CNN processing with an output vector of the first CNN unit as an input by using at least the second dilation parameter, wherein:
the feature vector represents a feature of an input audio, and
the information processing apparatus further comprises:
an extraction unit that generates the feature vector by extracting the feature from the input audio, and
a recognition unit that recognizes the audio by using an output vector of the second CNN unit.

2. The information processing apparatus according to claim 1, wherein the transformation unit generates the second stride parameter by multiplying the first stride parameter by the transformation parameter and generates the second dilation parameter by multiplying the first dilation parameter by a reciprocal of the transformation parameter.

3. The information processing apparatus according to claim 1, wherein:
the memory device stores therein a plurality of second stride parameters and a plurality of second dilation parameters, and
the transformation unit transforms the first stride parameter by selecting one second stride parameter from the plurality of second stride parameters based on the transformation parameter, and transforms the first dilation parameter by selecting one second dilation parameter from the plurality of second dilation parameters based on the transformation parameter.

4. The information processing apparatus according to claim 3, wherein:
each of the second stride parameters includes a parameter used for controlling an output resolution in a first direction and a parameter used for controlling an output resolution in a second direction, and
each of the second dilation parameters includes a parameter used for controlling an input resolution in the first direction and a parameter controlling an input resolution in the second direction.

5. The information processing apparatus according to claim 1, wherein:

a dimension of an output vector of the second CNN unit is one-dimension or higher dimensions, and
the information processing apparatus further comprises an interpolation unit that, in a case in which a resolution of the output vector of the second CNN unit in at least one dimension is insufficient, interpolates the resolution in the at least one dimension where the resolution is insufficient.

6. The information processing apparatus according to claim 1, wherein:
the recognition unit detects a keyword included in the audio by using the output vector of the second CNN unit, and
the information processing apparatus further comprises an activation unit that activates a command associated with the keyword.

7. A computer program product having a non-transitory computer readable medium including programmed instructions stored thereon, wherein the instructions, when executed by a computer, cause the computer to function as:
a memory control unit that reads a first stride parameter used for controlling an output resolution and a first dilation parameter used for controlling an input resolution from a memory device;
a transformation unit that transforms the first stride parameter to a second stride parameter and transforms the first dilation parameter to a second dilation parameter by using a transformation parameter;
a first convolutional neural network (CNN) unit that executes first CNN processing of a feature vector by using at least the second stride parameter; and
a second CNN unit that executes second CNN processing with an output vector of the first CNN unit as an input by using at least the second dilation parameter, wherein:
the feature vector represents a feature of an input audio, and
the instructions cause the computer to further function as:
an extraction unit that generates the feature vector by extracting the feature from the input audio, and
a recognition unit that recognizes the audio by using an output vector of the second CNN unit.

8. An information processing method implemented by an information processing apparatus, the method comprising:
reading a first stride parameter used for controlling an output resolution and a first dilation parameter used for controlling an input resolution from a memory device;
transforming the first stride parameter to a second stride parameter and transforming the first dilation parameter to a second dilation parameter by using a transformation parameter;
executing first convolutional neural network (CNN) processing of a feature vector by using at least the second stride parameter; and
executing second CNN processing with an output vector of the first CNN processing as an input by using at least the second dilation parameter, wherein:
the feature vector represents a feature of an input audio, and
the method further comprises:
generating the feature vector by extracting the feature from the input audio, and
recognizing the audio by using an output vector of the second CNN processing.

9. An information processing method implemented by an information processing apparatus, the method comprising:

reading a first stride parameter used for controlling an output resolution and a first dilation parameter used for controlling an input resolution from a memory device;

transforming the first stride parameter to a second stride parameter and transforming the first dilation parameter to a second dilation parameter by using a transformation parameter;

storing at least the second stride parameter in a second information processing apparatus as a parameter used in first convolutional neural network (CNN) processing of a feature vector; and storing at least the second dilation parameter in the second information processing apparatus as a parameter used in second CNN processing with an output vector of the first CNN processing as an input, wherein:

the feature vector represents a feature of an input audio, and the method further comprises:

generating the feature vector by extracting the feature from the input audio, and recognizing the audio by using an output vector of the second CNN processing.

\* \* \* \* \*